United States Patent
Chen

(10) Patent No.: US 11,434,391 B2
(45) Date of Patent: Sep. 6, 2022

(54) POLISHING COMPOSITION, POLISHING METHOD, AND METHOD OF PRODUCING SUBSTRATE

(71) Applicant: FUJIMI INCORPORATED, Aichi (JP)

(72) Inventor: Jingzhi Chen, Miaoli County (TW)

(73) Assignee: FUJIMI INCORPORATED, Aichi (JP)

( * ) Notice: Subject to any disclaimer, the term of this patent is extended or adjusted under 35 U.S.C. 154(b) by 193 days.

(21) Appl. No.: 16/579,162

(22) Filed: Sep. 23, 2019

(65) Prior Publication Data

US 2020/0102477 A1   Apr. 2, 2020

(30) Foreign Application Priority Data

Sep. 28, 2018   (JP) .............................. JP2018-183310

(51) Int. Cl.
*C09G 1/02*   (2006.01)
*B24B 37/04*   (2012.01)

(52) U.S. Cl.
CPC .............. *C09G 1/02* (2013.01); *B24B 37/044* (2013.01)

(58) Field of Classification Search
CPC .......... C09G 1/02; C09G 1/00; B24B 37/044; C23F 1/10

USPC .... 252/79.1, 79.2, 79.3, 79.4; 438/691, 692, 438/693
See application file for complete search history.

(56) References Cited

U.S. PATENT DOCUMENTS

2017/0175053 A1*   6/2017   Yokota ..................... C11D 7/26

FOREIGN PATENT DOCUMENTS

TW   201311842 A1   3/2019

* cited by examiner

*Primary Examiner* — Lan Vinh
(74) *Attorney, Agent, or Firm* — Katten Muchin Rosenman LLP

(57) ABSTRACT

Provided are a polishing composition capable of effectively reducing or eliminating a step difference on a surface of an object to be polished consisting of a single material, a method of using such a polishing composition, and a method of producing a substrate.
The polishing composition of the present invention contains an abrasive grain, a pH adjusting agent, a dispersing medium, and at least one kind of first water-soluble polymer having a lactam structure and at least one kind of second water-soluble polymer containing an alkylene oxide represented by the following Formula (I) in the structure, $$\mathrm{+C_xH_{2x}O+}_n \qquad (I)$$

(in the Formula (I), X is an integer of 3 or more and n is an integer of 2 or more.).

10 Claims, No Drawings

POLISHING COMPOSITION, POLISHING METHOD, AND METHOD OF PRODUCING SUBSTRATE

1. TECHNICAL FIELD

The present invention relates to a polishing composition, a polishing method using the polishing composition, and a method of producing a substrate.

2. DESCRIPTION OF RELATED ARTS

In general, a planarization technique of enhancing flatness of a semiconductor substrate (for example, wafer) surface has been used in the semiconductor industry. Chemical mechanical polishing (CMP) is one of the commonly used planarization techniques. The chemical mechanical polishing technique is a method of flattening a surface of an object to be polished (polished object) such as a semiconductor substrate using a polishing composition containing abrasive grains such as silica, alumina, and ceria, an anticorrosion agent, a surfactant, and the like.

Meanwhile, a silicon substrate containing a germanium material (sometimes abbreviated as "germanium-containing substrate" in this specification) as a semiconductor substrate has been also in widespread use. Thus, a need for polishing compositions applied to polish the germanium-containing substrate has been also increasing.

Taiwan Patent Application No. 201311842 A1 discloses a chemical mechanical polishing composition including (A) an inorganic particle, an organic particle, or a mixture or composite thereof, (B) at least one kind of oxidizing agent, and (C) an aqueous medium. The chemical mechanical polishing composition disclosed in Taiwan Patent Application No. 201311842 A1 can be applied to chemical mechanical polishing of a germanium element or silicon germanium.

SUMMARY

When the surface of the same object to be polished has portions with different heights, such a height difference is usually called "step difference". In a process of the chemical mechanical polishing, each material is different in polishing speed (in the present specification, "polishing speed" may be referred to as "removing speed"). Therefore, in a case where two or more different types of materials are included in the surface of the same object to be polished, a top surface of each material may have different heights after performing chemical mechanical polishing. More specifically, a material with relatively high polishing speed is removed more, and thereby the top surface of this material is lower than the top surfaces of other materials. In other words, when the same object to be polished which is made of different materials is polished, a step difference may be generated on the surface of the object to be polished.

And, typical polishing compositions have the same removing speed for the same material. Therefore, in a case where there is a step difference on the surface of the same object to be polished which is made of a single material, this step is naturally easily left. In other words, in the chemical mechanical polishing, it is difficult to eliminate the step difference present on the surface of the same object to be polished which is made of a single material.

The present invention has been completed in view of the above-mentioned actual situation, and an object thereof is to provide a polishing composition capable of effectively reducing or eliminating a step difference on the surface of the same object to be polished which is made of a single material. The present invention also provides a polishing method using the polishing composition and a method of producing a substrate.

In order to achieve at least one of the above objects, some embodiments of the present invention disclose a polishing composition containing an abrasive grain, a pH adjusting agent, a dispersing medium, and at least one kind of first water-soluble polymer having a lactam structure and at least one kind of second water-soluble polymer containing an alkylene oxide represented by the following Formula (I) in the structure.

[Chem. 1]

(I)

In the Formula (I), X is an integer of 3 or more, and n is an integer of 2 or more.

Further, other embodiments of the present invention disclose a polishing method for polishing an object to be polished using the above-described polishing composition, in which a material of the object to be polished is $Si_YGe_{(1-Y)}$ (here, $0 \leq Y < 1$).

Still other embodiments of the present invention disclose a method of producing a polished substrate including a step of preparing a substrate and a step of polishing the substrate using the above-described polishing composition.

DETAILED DESCRIPTION

In order that the above and other objects, features, and advantages of the present invention may be more clearly and easily understood, preferable embodiments will be exemplified and described in detail below.

Hereinbelow, the embodiments of the present invention will be described. The present invention is not limited to these embodiments.

According to one embodiment of the present invention, there is provided a polishing composition containing an abrasive grain, a pH adjusting agent, a dispersing medium, and at least one kind of first water-soluble polymer having a lactam structure and at least one kind of second water-soluble polymer containing an alkylene oxide represented by the following Formula (I) in the structure. According to the present embodiment, the following technical effects can be obtained. That is, two kinds of water-soluble polymers each having a specific structure are used in the polishing composition. When polishing is performed using such a polishing composition, it is possible to increase the difference in removing speed of portions having different heights on the surface of the same object to be polished. In other words, the difference in the removing speed of the same material under different polishing pressures can be increased. Therefore, even in the case of polishing the same object to be polished made of the same material, it is possible to effectively reduce or eliminate the step difference present on the surface. The difference between the removing speeds is more precisely the ratio of the removing speeds, specifically, the ratio of the removing speeds of the high portion to the low portion among the portions having different heights.

[Chem. 2]

(I)

In the Formula (I), X is an integer of 3 or more, and n is an integer of 2 or more.

In the present embodiment, the polishing composition contains two kinds of water-soluble polymers each having a specific structure. When polishing is performed using the polishing composition of the present embodiment, it is possible to increase the difference (ratio) in removing speed of portions having different heights on the surface of the same object to be polished. In other words, the difference (ratio) in the removing speed of the same material under different polishing pressures can be increased. Therefore, even in the case of polishing the same object to be polished made of the same material, it is possible to effectively reduce or eliminate the step difference present on the surface.

The object to be polished applied to the polishing composition according to the present invention is not particularly limited and is preferably a common semiconductor substrate. Examples of the object to be polished include a silicon-containing substrate (for example, amorphous silicon, crystalline silicon, silica, silicon nitride, and the like) and a germanium-containing substrate. As a specific example of the object to be polished, for example, $Si_YGe_{(1-Y)}$ (here, $0 \leq Y < 1$) can be exemplified. Among the objects to be polished, the polishing composition according to the present invention is particularly suitable for polishing the germanium-containing substrate. As a specific example of the germanium-containing substrate, for example, $Si_ZGe_{(1-Z)}$ (here, $0.01 \leq Z < 1$) can be exemplified. Note that, the "silicon-containing substrate" does not contain germanium. In one aspect of the present invention, Z is preferably 0.05 to 0.95, and more preferably 0.1 to 0.90.

The polishing composition of the present embodiment contains at least one kind of first water-soluble polymer and at least one kind of second water-soluble polymer. The first water-soluble polymer has a lactam structure. The structure of the second water-soluble polymer includes an alkylene oxide represented by the following Formula (I).

[Chem. 3]

$$\mathrm{+C_xH_{2x}O+}_n \qquad (I)$$

In the Formula (I), X is an integer of 3 or more, and n is an integer of 2 or more.

The present inventors infer as follows about a mechanism which can reduce or eliminate a step difference of the polishing composition according to the present invention. Note that, the mechanism described below is presumed and that whether this mechanism is accurate does not affect the technical content and claims of the present invention.

First, the present inventors have conducted experiments to examine the influence of the first water-soluble polymer and the second water-soluble polymer on the removing speed of the object to be polished, respectively.

As a result of the experiment, it has been found that the first water-soluble polymer increases the removing speed of the object to be polished. Therefore, the present inventors presumed that when the first water-soluble polymer is adsorbed on the surface of the object to be polished, the hydrophilicity (or wettability) of the object to be polished is increased, and thus affinity between the polishing composition (polishing liquid) and the surface to be polished is improved, and thereby the removing speed of the object to be polished can be increased. The polishing composition of the present invention is also applicable to the polishing other than the silicon substrate containing a germanium material.

As a result of the experiment, it has been found that the second water-soluble polymer decreases the removing speed of the object to be polished. The present inventor have presumed that when the second water-soluble polymer is adsorbed on the surface of the object to be polished, the hydrophilicity (or wettability) of the object to be polished is reduced, and thus a repulsive force between the polishing composition and the surface to be polished is enhanced, and thereby the removing speed of the object to be polished is reduced.

As described above, a sentence of "there is a step difference on the polishing surface of the object to be polished" means that the polishing surface of the same object to be polished include a relatively high portion and a relatively low portion. When performing the chemical mechanical polishing, it is common to use a flat polishing pad. When a relatively high area of the surface of the same object to be polished is observed during polishing of the object to be polished having a step difference, the distance between the surface of the object to be polished and the polishing pad in this area is short. Although the mechanism is unknown, it is considered that the first water-soluble polymer becomes easy to work when the distance between the surface of the object to be polished and the polishing pad is short, and the second water-soluble polymer becomes easy to work when the distance is long.

After the chemical mechanical polishing is continuously performed for a predetermined period using the polishing composition according to the present invention, the amount of material removed becomes larger in the area where the original height of the surface of the same object to be polished is relatively high. The lower the surface becomes, the lower the polishing pressure and removing speed in this area becomes. Finally, when the surface heights of the entire surface of the object to be polished are uniform (that is, flattened), the polishing pressure and the removing speed are also uniform and then, even if the polishing is continued, a step difference does not occur. In this way, it is possible to reduce or eliminate the step difference present on the surface of the object to be polished.

Hereinafter, various components contained in the polishing composition according to the present embodiment will be described.

[Abrasive Grain]

The polishing composition of the present embodiment contains abrasive grains. The abrasive grains may be any of inorganic particles and organic particles. Specific examples of the inorganic particles include particles made of metal oxides such as silica, alumina, ceria, and titania, for example. Specific examples of the organic particles include polymethyl methacrylate (PMMA) particles. Among these, silica particles are preferable, and colloidal silica is more preferable. The abrasive grains described above can be used alone or two or more kinds thereof can be used in combination.

The content of the abrasive grains in the polishing composition is preferably 0.01% by weight or more, more preferably 0.05% by weight or more, further preferably 0.1% by weight or more, and still more preferably 0.5% by weight or more. As the content of abrasive grains increases, the polishing speed on the object to be polished (for example, the object to be polished including the germanium material) is increased.

The content of abrasive grains in the polishing composition is preferably 20% by weight or less, more preferably 10% by weight or less, further preferably 5% by weight or less, and may be 3% by weight or less. As the content of the abrasive grains is decreased, the material cost of the polishing composition can be reduced, and moreover, the aggregation of the abrasive grains is less likely to occur.

An average primary particle size of the abrasive grains is preferably 5 nm or more, more preferably 7 nm or more, further preferably 10 nm or more, still more preferably 25 nm or more, and particularly preferably 30 nm or more. As the average primary particle size of the abrasive grains is increased, the polishing speed on the object to be polished (for example, the object to be polished including the germanium material) is increased. A specific surface area of the abrasive grains can be measured by a BET method, and a value of the average primary particle size of the abrasive grains can be calculated based on the measured specific surface area.

The average primary particle size of the abrasive grains is preferably 120 nm or less, more preferably 80 nm or less, further preferably 50 nm or less, and still more preferably 40 nm or less. As the average primary particle size of the abrasive grains is decreased, it is possible to easily obtain a polished surface with fewer scratches when polishing the object to be polished using the polishing composition.

An average secondary particle size of the abrasive grains is preferably 10 nm or more, more preferably 20 nm or more, further preferably 30 nm or more, and particularly preferably 50 nm or more. As the average secondary particle size of the abrasive grains is increased, the polishing speed on the object to be polished (for example, the object to be polished including the germanium material) is increased.

The average secondary particle size of the abrasive grains is preferably 250 nm or less, more preferably 200 nm or less, further preferably 150 nm or less, and particularly preferably 100 nm or less. As the average secondary particle size of the abrasive grains is decreased, it is possible to easily obtain a polished surface with fewer scratches when polishing the object to be polished using the polishing composition. The value of the average secondary particle size of the abrasive grains can be measured by a suitable method, such as a laser light scattering method.

The abrasive grains may be surface-modified. Since common colloidal silica has a zeta potential value close to zero under acidic conditions, the silica particles do not electrically repel each other under the acidic conditions and aggregation tends to occur. On the other hand, the surface-modified abrasive grains which are modified so that the zeta potential has a relatively large positive or negative value even under the acidic conditions strongly repel each other and disperse well under the acidic conditions. As a result, the storage stability of the polishing composition is improved. Such surface-modified abrasive grain is obtained, for example, by mixing a metal such as aluminum, titanium or zirconium, or an oxide of these metals with the abrasive grain and doping the surface of the abrasive grain. And, under basic conditions, the zeta potential exhibits a negative value regardless of the surface modification, and thus the abrasive grains basically disperse well. However, the surface-modified abrasive grains have a larger absolute value of the zeta potential than the unmodified abrasive grains, and thus can disperse more stably.

The surface-modified abrasive grains contained in the polishing composition may be silicas having organic acid immobilized on the surface thereof. Among them, colloidal silica in which organic acid is immobilized on the surface thereof is preferable. Immobilization of the organic acid onto the colloidal silica surface is carried out by chemically bonding a functional group of the organic acid to the surface of the colloidal silica. The organic acid cannot be immobilized on the surface of the colloidal silica simply by the coexistence of the colloidal silica and the organic acid. If it is desired to immobilize sulfonic acid, which is a kind of organic acid, on colloidal silica, it can be performed by, for example, a method disclosed in "Sulfonic acid-functionalized silica through quantitative oxidation of thiol groups", Chem. Commun. 246-247 (2003). Specifically, when coupling a silane coupling agent having a thiol group such as 3-mercaptopropyltrimethoxysilane (3-mercaptopropyl) trimethoxysilane) with colloidal silica and then oxidizing the thiol group with hydrogen peroxide, colloidal silica in which sulfonic acid is immobilized on the surface can be obtained. The colloidal silica used in the examples of the present application is also produced as described above. Alternatively, if it is desired to immobilize the carboxylic acid on the colloidal silica surface, it can be performed by, for example, a method described in "Novel Silane Coupling Agents Containing a Photolabile 2-Nitrobenzyl Ester for Introduction of a Carboxy Group on the Surface of Silica Gel", Chemistry Letters, 3, 228-229 (2000). Specifically, when coupling a silane coupling agent containing a photoreactive 2-nitrobenzyl ester with colloidal silica, and then immobilizing the carboxylic acid on the surface by light irradiation, the colloidal silica can be obtained.

[First Water-Soluble Polymer]

The polishing composition of the present embodiment contains at least one kind of first water-soluble polymer. By using the first water-soluble polymer having a lactam structure, the removing speed of the portion where the relative height of the surface of the same object to be polished is higher (that is, the polishing pressure is larger) can be increased. At the same time, the removing speed of the portion where the relative height of the surface of the same object to be polished is lower (that is, the polishing pressure is smaller) can be decreased. In other words, if the polishing is performed using the polishing composition containing the first water-soluble polymer, the difference (ratio) in the removing speed of portions having different heights on the surface of the same object to be polished is increased, which is useful to reduce or eliminate the step difference.

In the present specification, "lactam structure" may include a β-lactam structure, a γ-lactam structure, a δ-lactam structure, a ε-caprolactam structure, or other lactam structures. The first water-soluble polymer can be synthesized using a monomer containing a lactam structure. And, the "monomer containing a lactam structure" in the present specification may include a monomer having a polymerizable group (for example, a vinyl group) at a nitrogen atom of lactam.

The first water-soluble polymer may include a polymer obtained by polymerizing (derived from) a monomer containing the lactam structure, or a copolymer obtained by polymerizing (derived from) a monomer containing the lactam structure and another monomer. Therefore, according to one aspect of the present invention, the first water-soluble polymer is a homopolymer polymerizing (derived from) a monomer containing the lactam structure, or a copolymer polymerizing (derived from) a monomer containing the lactam structure and another monomer. Examples of other monomers can include, for example, vinyl alcohol, vinyl acetate, and other suitable monomers. In embodiments where the first water-soluble polymer is a copolymer, the type of copolymer is not particularly limited, for example, the first water-soluble polymer may be a block copolymer, a random copolymer, a grafted copolymer, or any other type of copolymer.

In some embodiments, the first water-soluble polymer is a homopolymer of the monomer containing the lactam structure (polylactam). Specific examples of the polylactam may be at least one kind selected from the group consisting of polyvinyl pyrrolidone (PVP), polyvinyl caprolactam, polyvinyl valerolactam, polyvinyl laurolactam, and polyvinyl piperidone. Among these polylactams, polyvinyl pyrrolidone is preferable.

A weight average molecular weight (MW) of the first water-soluble polymer is preferably 500,000 or less, more preferably 200,000 or less, further preferably 100,000 or less, and still more preferably 65,000 or less. And, the weight average molecular weight of the first water-soluble polymer is preferably 3,000 or more, more preferably 4,000 or more, further preferably 5,200 or more, still more preferably 6,000 or more, even more preferably 7,000 or more, even still more preferably 8,000 or more, even still more preferably 10,000 or more, may be 15,000 or more, may be 20,000 or more, may be 25,000 or more, may be 30,000 or more, may be 40,000 or more, may be 50,000 or more, and may be 55,000 or more. The weight average molecular weight in the present specification can be measured by gel permeation chromatography (GPC) using polystyrene as a standard substance.

If the weight average molecular weight of the first water-soluble polymer is more than 500,000, the abrasive grains aggregate with the passage of time after preparation of the polishing composition, resulting in a decrease in operability. Furthermore, if the weight average molecular weight of the first water-soluble polymer is excessively high, the steric structure of the first water-soluble polymer may become excessively large. In this case, it is not possible to sufficiently protect the surface because gaps are easily formed between the water-soluble polymers adsorbed to the object to be polished. Therefore, it is difficult to reduce the removing speed of the portion where the relative height of the surface of the same object to be polished is lower (the polishing pressure is smaller), and the difference (ratio) in removing speed of portions having different heights on the surface of the same object to be polished is excessively decreased. This is disadvantageous for reducing or eliminating the step difference.

And, if the weight average molecular weight of the first water-soluble polymer is less than 3,000, the steric structure of the first water-soluble polymer may become excessively small. In this case, when the adsorption of the water-soluble polymer on the object to be polished becomes too dense, the surface is overprotected. Therefore, it becomes difficult to exert the effect of increasing the removing speed of the portion where the relative height of the surface of the same object to be polished is higher (the polishing pressure becomes larger). This is disadvantageous for reducing or eliminating the step difference.

The content of the first water-soluble polymer in the polishing composition is preferably 10,000 ppm or less, more preferably 5,000 ppm or less, further preferably 1,000 ppm or less, still more preferably 500 ppm or less, and particularly preferably 200 ppm or less. In particular, when the content is 200 ppm or less, the overall polishing speed can be improved. The content of the first water-soluble polymer in the polishing composition is preferably 1 ppm or more, more preferably 10 ppm or more, further preferably 50 ppm or more, and still more preferably 75 ppm or more. In the present specification, "ppm" refers to "weight ppm=mass ppm".

If the content of the first water-soluble polymer in the polishing composition is greater than 10,000 ppm, the abrasive grains are coagulated with the passage of time after preparation of the polishing composition, resulting in a decrease in operability. If the content of the first water-soluble polymer in the polishing composition is excessively large, an effect of removing the object to be polished may be weakened. Therefore, it is difficult to increase the removing speed of the portion where the relative height of the surface of the same object to be polished is higher (the polishing pressure is larger), and the difference (ratio) in removing speed of portions having different heights on the surface of the same object to be polished is excessively decreased. This is disadvantageous for reducing or eliminating the step difference.

And, when the content of the first water-soluble polymer in the polishing composition is less than 1 ppm, the number of the first water-soluble polymer which is adsorbed to the area of the object to be polished whose relative height on the surface is lower is excessively small, and thus the effect of reducing the removing speed of the portion where the relative height of the surface of the same object to be polished is lower (the polishing pressure is smaller) may be weakened. This is disadvantageous for reducing or eliminating the step difference.

[Second Water-Soluble Polymer]

The polishing composition of the present embodiment contains at least one kind of second water-soluble polymer. The structure of the second water-soluble polymer includes an alkylene oxide represented by the following Formula (I).

[Chem. 4]

$$\text{---}(C_xH_{2x}O)_n\text{---} \quad (I)$$

In the Formula (I), X is an integer of 3 or more, and n is an integer of 2 or more.

By using the second water-soluble polymer having alkylene oxide represented by Formula (I), the removing speed of the portion where the relative height of the surface of the same object to be polished is lower (that is, the polishing pressure is smaller) can be reduced. In other words, if the polishing is performed using the polishing composition containing the second water-soluble polymer, the difference (ratio) in the removing speed of portions having different heights on the surface of the same object to be polished is increased, which is useful to reduce or eliminate the step difference.

The numerical value of X in the Formula (I) represents a monomer used to synthesize the second water-soluble polymer. For example, when X in the Formula (I) is equal to 3, the monomer used to synthesize the second water-soluble polymer is propylene glycol and the second water-soluble polymer represents polypropylene glycol. Further, the numerical value of n in the Formula (I) represents the number of a repeating unit in a single second water-soluble polymer. Therefore, the weight molecular weight of the second water-soluble polymer can be estimated from the numerical values of X and n. The upper limit value of X and the upper limit value of n are not particularly limited, but in order to make the solubility of the second water-soluble polymer in the polishing composition good and to be advantageous for reducing the step difference, the upper limit value of X is preferably 12, more preferably 6, further preferably 5, and is still more preferably 4. The upper limit value of n is preferably 150, more preferably 100, further preferably 50, and still more preferably 20. The lower limit value of n is preferably 3, more preferably 4, and further preferably 5.

Specific examples of the second water-soluble polymer can include polypropylene glycol (PPG) polybutylene glycol, polypentylene glycol, polyhexylene glycol, polyheptylene glycol, polyoctylene glycol, polynonylene glycol, and polydecylene glycol. In some preferable embodiments, the second water-soluble polymer is polypropylene glycol or polybutylene glycol. In other more preferable embodiments, the second water-soluble polymer is polypropylene glycol. According to one embodiment of the present invention, the second water-soluble polymer is polypropylene glycol (PPG) or polybutylene glycol. With such an embodiment, the intended effect of the present invention can be exhibited efficiently.

The weight average molecular weight of the second water-soluble polymer is preferably 3,000 or less, more preferably less than 3,000, more preferably 2,000 or less, further preferably 1,200 or less, and particularly preferably 800 or less. And, the weight average molecular weight of the second water-soluble polymer is preferably 200 or more, and more preferably 300 or more.

If the weight average molecular weight of the second water-soluble polymer is more than 3,000, there is a concern that the abrasive grains aggregate with the passage of time after preparation of the polishing composition, resulting in a decrease in operability. Furthermore, if the weight average molecular weight of the second water-soluble polymer is excessively high, the cloud point of the second water-soluble polymer may be excessively low. As for a glycol solution containing an alkylene oxide structure, the solubility of a glycol compound drops with increasing of temperature. It is considered that when the temperature rises to a certain temperature, the glycol solution causes phase separation and begins to split into two layers, which causes the solution to become cloudy. The so-called "cloud point" (also, referred to as "cloud point temperature") refers to a particular temperature at which the solution begins to become cloudy. If the cloud point of the second water-soluble polymer is excessively low (for example, the cloud point is lower than room temperature or lower than the operating temperature of the chemical mechanical polishing process), the second water-soluble polymer in the polishing composition causes phase separation with the dispersing medium and tends to precipitate. In this case, the polishing composition is degraded, and a polishing action of the polishing composition is reduced.

And, if the weight average molecular weight of the second water-soluble polymer is smaller than 200, the steric structure of the second water-soluble polymer may become excessively small, and even if the number of the second water-soluble polymer which is adsorbed on the surface of the object to be polished is large, it is considered that protecting the object to be polished is still difficult. Therefore, it is difficult to reduce the removing speed of the portion where the relative height of the surface of the same object to be polished is lower (the polishing pressure is smaller). This is disadvantageous for reducing or eliminating the step difference.

According to one embodiment of the present invention, the polishing composition contains the first water-soluble polymer and the second water-soluble polymer, and the weight average molecular weight of the first water-soluble polymer is 3,000 or more and the weight average molecular weight of the second water-soluble polymer is less than 3,000. Thus, the intended effects of the present invention can be efficiently exhibited by containing two or more kinds of water-soluble polymers and setting the weight average molecular weight of each water-soluble polymer as described above. In the present embodiment, the upper limit and the lower limit of the weight average molecular weight of the first water-soluble polymer and the second water-soluble polymer can be freely selected from the values described above. Specifically, for example, the lower limit of the weight average molecular weight of the first water-soluble polymer may be 8,000 or more, or 30,000 or more. Note that, the upper and lower limits such as numerical values described in the present specification are not limited to the present embodiment, and the upper and lower limit values can be freely selected, and only the upper limit value or only the lower limit value can be freely selected.

The content of the second water-soluble polymer in the polishing composition is preferably 5,000 ppm or less, more preferably 4,000 ppm or less, further preferably 3,000 ppm or less, still more preferably 2,000 ppm or less, even still more 1,000 ppm or less, and is particularly preferably 800 ppm or less. In particular, when the content is 800 ppm or less, the overall polishing speed can be improved. Further, the content of the second water-soluble polymer in the polishing composition is preferably 10 ppm or more, more preferably 50 ppm or more, further preferably 100 ppm or more, still more preferably 200 ppm or more, even still more preferably 300 ppm, and particularly preferably 400 ppm or more.

If the content of the second water-soluble polymer in the polishing composition is greater than 5,000 ppm, there is a concern that the abrasive grains are coagulated with the passage of time after preparation of the polishing composition, resulting in a decrease in operability. Further, when the content of the second water-soluble polymer in the polishing composition is excessively large, the number of the second water-soluble polymer which is adsorbed to the area of the object to be polished whose relative height on the surface is excessively large, and thereby it may be difficult to remove the object to be polished. For this reason, it is difficult to increase the removing speed of the portion where the relative height of the surface of the same object to be polished is higher (the polishing pressure is larger), and the difference (ratio) in removing speed of portions having different heights on the surface of the same object to be polished is excessively decreased. This is disadvantageous for reducing or eliminating the step difference.

And, when the content of the second water-soluble polymer in the polishing composition is less than 10 ppm, the number of the second water-soluble polymer which is adsorbed to the area of the object to be polished whose relative height on the surface is lower is excessively small, and thus it may be difficult to protect the object to be polished. For this reason, it is difficult to reduce the removing speed of the portion where the relative height of the surface of the same object to be polished is lower (the polishing pressure is smaller). This is disadvantageous for reducing or eliminating the step difference.

[pH Adjusting Agent]

The polishing composition of the present embodiment contains a pH adjusting agent. The pH adjusting agent can adjust a pH value of the polishing composition to a desired value. As the pH adjusting agent, known acids or bases can be used.

The acid as the pH adjusting agent used in the polishing composition of the present embodiment may be inorganic acid or organic acid, or may be a chelating agent. Specific examples of the inorganic acid that can be used as the pH adjusting agent can include hydrochloric acid (HCl), sulfuric acid ($H_2SO_4$), nitric acid ($HNO_3$), hydrofluoric acid (HF), boric acid ($H_3BO_3$), carbonic acid ($H_2CO_3$), hypophosphorous acid ($H_3PO_2$), phosphorous acid ($H_3PO_3$), and phosphoric acid ($H_3PO_4$). Among these inorganic acids, hydrochloric acid, sulfuric acid, nitric acid and phosphoric acid are preferable.

Specific examples of organic acids that can be used as pH adjusting agents include, for example, formic acid, acetic acid, propionic acid, butyric acid, valeric acid, 2-methylbutyric acid, n-hexanoic acid, 3,3-dimethylbutyric acid, 2-ethylbutyric acid 4-methylpentanoic acid, n-heptanoic acid, 2-methylhexanoic acid, n-octanoic acid, 2-ethylhexanoic acid, benzoic acid, hydroxyacetic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, glyoxylic acid, 2-furancarboxylic acid, 2,5-furandicarboxylic acid, 3-furancarboxylic acid, 2-tetrahydrofuran carboxylic acid, methoxyacetic acid, methoxyphenylacetic acid, and phenoxyacetic acid. Organic sulfuric acids such as methanesulfonic acid, ethanesulfonic acid, and 2-hydroxyethanesulfonic acid may be used. Among these organic acids, monocarboxylic acid such as acetic acid; dicarboxylic acids such as malonic acid, succinic acid, glutaric acid, adipic acid, pimelic acid, maleic acid, phthalic acid, malic acid, and tartaric acid; and tricarboxylic acid such as citric acid.

Examples of a base as a pH adjusting agent used in the polishing composition of the present embodiment include hydroxides or salts of alkali metals, hydroxides or salts of Group 2 elements, quaternary ammonium hydroxides or salts thereof, ammonia, and amines. Specific examples of the alkali metal include potassium and sodium.

The pH value of the polishing composition of the present embodiment is preferably 9 or less, more preferably 8 or less, and further preferably 7 or less. The pH value of the polishing composition of the present embodiment may be less than 7, may be 6 or less, may be less than 6, may be 5 or less, may be less than 5, may be 4 or less, may be less than 4, may be 3 or less, may be less than 3, or may be 2.8 or less. Furthermore, the lower limit value of the pH value of the polishing composition of the present embodiment is not particularly limited, and in consideration of process safety and the burden of waste water treatment, it is preferably 1 or more, more preferably 2 or more, and it may be more than 2, 3 or more, more than 3, 4 or more, more than 4, 5 or more, more than 5, 6 or more, more than 6, 7 or more, or more than 7. In the embodiment of the present invention, the pH value of the polishing composition is preferably 1 to 9.

When the polishing composition is alkaline (that is, the pH is greater than 7), the portion of the material containing germanium of object to be polished is corroded. Such corrosion can increase the removing speed of the portion containing the germanium material. However, when the pH is excessively high (for example, the pH is greater than 9), the removing speed of the relatively lower height portion of the surface of the same object to be polished is increased, and the difference (ratio) in removing speed of portions having different heights on the surface of the same object to be polished is excessively decreased. This is disadvantageous for reducing or eliminating the step difference. According to the embodiment of the present invention, the pH of the polishing composition is 9 or less, and the content of the second water-soluble polymer in the polishing composition is 5,000 ppm or less. According to such an embodiment, the intended effect of the present invention can be exhibited efficiently. Also in the present embodiment, the upper limit and the lower limit of the pH of the polishing composition, and the upper limit value and the lower limit value of the content of the second water-soluble polymer can be freely selected as described above.

[Dispersing Medium]

The polishing composition of the present embodiment contains a dispersing medium (which may be referred to as a "solvent"). The dispersing medium can be used to disperse or dissolve each component in the polishing composition. In the present embodiment, the polishing composition may contain water as a dispersing medium.

From the viewpoint of suppressing inhibition of the action of other components, water containing as little impurity as possible is preferable. More specifically, pure water or ultrapure water from which foreign matter has been removed through a filter after removing impurity ions with an ion exchange resin, or distilled water is preferable.

[Oxidizing Agent]

The polishing composition of the embodiment of the present invention (or used in the polishing method of the embodiment of the present invention) may further contain an oxidizing agent, if necessary. The type of oxidizing agent contained in the polishing composition is not particularly limited, but is preferably one having a standard electrode potential of 0.3 V or more. As compared to a case of using an oxidizing agent having a standard electrode potential of less than 0.3 V, the use of the oxidizing agent having a standard electrode potential of 0.3 V or more is useful for further increasing the polishing speed of the germanium material portion and the silicon material portion performed using the polishing composition. Specific examples of the oxidizing agent having a standard electrode potential of 0.3 V or more can include hydrogen peroxide, sodium peroxide, barium peroxide, organic oxidizing agent, ozone water, salt of silver (II), salt of iron (III) and permanganic acid, chromic acid, dichromic acid, peroxodisulfuric acid, peroxophosphoric acid, peroxosulfuric acid, peroxoboric acid, performic acid, peracetic acid, perbenzoic acid, perphthalic acid, hypochlorous acid, hypobromous acid, hypoiodous acid, chloric acid, chlorous acid, perchloric acid, bromic acid, iodic acid, periodic acid, sulfuric acid, persulfuric acid, dichloroisocyanuric acid, and salts thereof. These oxidizing agents may be used alone or two or more kinds thereof may be used in combination. The upper limit of the standard electrode potential is not particularly limited, and is preferably 3.0 V or less, 2.5 V or less, 2.0 V or less or the like.

Among the above oxidizing agents, hydrogen peroxide ammonium persulfate, periodic acid, hypochlorous acid and sodium dichloroisocyanurate are preferable in consideration of effectively increasing the polishing speed of the germanium material portion and the silicon material portion performed using the polishing composition.

The standard electrode potential refers to the electrode potential when all the chemical species involved in the oxidation reaction are in the standard state, and is represented by the following Equation 1.

[Math. 1]

$$E0=-\Delta G0/nF=(RT/nF)1\text{ n}K \qquad \text{Equation 1}$$

In Equation 1, E0 is a standard electrode potential, $\Delta G0$ is a standard Gibbs energy change of oxidation reaction, K is equilibrium constant thereof, F is a Faraday constant, T is an absolute temperature, and n is the number of electrons involved in the oxidation reaction. As can be seen from Equation 1, since the standard electrode potential fluctuates with temperature, a standard electrode potential at 25° C. is employed in this specification. The standard electrode potential of the aqueous solution system is described in, for example, Revised 4th Edition Chemical Handbook (basic edition) II, pp. 464 to 468 (edited by The Chemical Society of Japan).

The content of the oxidizing agent in the polishing composition is preferably 0.01 mol/L or more, and more preferably 0.1 mol/L or more. As the content of the oxidizing agent is increased, the polishing speed of the germanium material portion by the polishing composition can be increased. The content of the oxidizing agent in the polishing composition is preferably 0.001% by mass or more, more preferably 0.01% by mass or more, and further preferably 0.05% by mass or more. And, the content of the oxidizing agent in the polishing composition is preferably 10% by mass or less, more preferably 5% by mass or less, and further preferably 1% by mass or less.

The content of the oxidizing agent in the polishing composition is preferably 2 mol/L or less, more preferably 1 mol/L or less, and further preferably 0.5 mol/L or less. As the content of the oxidizing agent is decreased, the material cost of the polishing composition can be reduced, and the burden of processing the polishing composition after the polishing process (that is, the burden of waste water treatment) can also be reduced.

[Other Components]

The polishing composition used in the polishing method of the present invention may further contain other components such as amino acid, a chelating agent, a metal anticorrosive, an antiseptic agent, an antifungal agent, and the like, if necessary.

[Polishing Method and Method of Producing Substrate]

As described above, the polishing composition according to the present invention is suitable for polishing a silicon-containing substrate and a germanium-containing substrate. Thus, the present invention provides a polishing method for polishing an object to be polished containing a germanium material with the polishing composition according to the present invention. The object to be polished may be $Si_Y Ge_{(1-Y)}$ (here, $0 \leq Y < 1$). Therefore, the present invention provides a polishing method including a step of polishing the object to be polished with the above-described polishing composition, in which a material of the object to be polished is $Si_Y Ge_{(1-Y)}$ (here, $0 \leq Y < 1$). The present invention also provides a method of producing a polished substrate, including a step of preparing a substrate; and a step of polishing the substrate using the above-mentioned polishing composition. The polishing composition according to the present invention is particularly suitable for polishing the germanium-containing substrate. Accordingly, the present invention provides a method of producing a polished substrate, including a step of polishing a silicon substrate containing a germanium material using the polishing composition according to the present invention. The silicon substrate containing the germanium material may be $Si_Z Ge_{(1-Z)}$ (here, $0.01 \leq Z < 1$).

As a polishing apparatus used in the polishing step, a polishing apparatus used in a general chemical mechanical polishing process can be used. The polishing apparatus is provided with a carrier for holding an object to be polished, a motor capable of changing the number of rotations, and the like, and a platen on which a polishing pad (or polishing cloth) can be attached.

The above-described polishing pad is not particularly limited, and it is possible to use a common non-woven fabric, a pad made of a polyurethane resin, a pad made of a porous fluororesin, and the like. Further, if necessary, the polishing pad can be grooved, which allows the polishing composition to be collected in the grooves of the polishing pad.

The parameter conditions of the polishing step are not particularly limited, and adjustments can be made if necessary. For example, the rotation speed of the platen can be set 10 to 500 rpm, the rotation speed of the carrier can be set 10 to 500 rpm, and the flow rate of the polishing composition can be set 10 to 500 ml/min. The method of supplying the polishing composition to the polishing pad is not particularly limited, and, for example, a method of continuous supplying by a pump or the like can be employed.

In one aspect of the present invention, the pressure (polishing pressure) applied to the object to be polished is preferably 0.1 to 10 psi, and more preferably 2 to 3 psi.

After completion of the polishing step, the object to be polished is washed in a water stream and dried by using a rotary dryer or the like to remove water droplets adhering to the object to be polished, thereby obtaining a substrate having a flat surface and no step difference or a reduced difference.

Further, according to one embodiment of the present invention, assuming that the removing speed of the object to be polished is set as a first removing speed when the polishing pressure is 3.1 to 5.0 psi (particularly preferably 4.1 psi), and the removing speed of the object to be polished is set as a second removing speed when the polishing pressure is 0.5 to 1.9 psi (particularly preferably 1.4 psi), the value of the ratio of the first removing speed to the second removing speed is greater than 3. According to the present embodiment, the intended effect (reduction or elimination of the step difference) of the present invention is efficiently exhibited. The ratio is more preferably 3.1 or more, further preferably 3.5 or more, and still more preferably 4.0 or more. According to the present embodiment, it has the technical effect that a step difference can be eliminated more efficiently. The higher the ratio, the better, and there is no upper limit, but practically it is about 10 or less.

Therefore, according to one embodiment of the present invention, it is possible to provide a polishing composition capable of further increasing the polishing speed at a polishing pressure of 3.1 to 5.0 psi and further reducing the polishing speed at a polishing pressure of 0.5 to 1.9 psi.

The present invention discloses the following aspects.

1. A polishing composition containing an abrasive grain, a pH adjusting agent, a dispersing medium, and at least one kind of first water-soluble polymer having a lactam structure and at least one kind of second water-soluble polymer containing an alkylene oxide represented by the following Formula (I) in the structure,

[Chem. 5]

$$\mathrm{+C_xH_{2x}O+}_n \tag{I}$$

(in the Formula (I), X is an integer of 3 or more and n is an integer of 2 or more.).

2. The polishing composition according to 1., in which the first water-soluble polymer is a polylactam, or a copolymer of a monomer containing a lactam structure and another monomer.

3. The polishing composition according to 2., in which the polylactam includes at least one kind selected from the group consisting of polyvinyl pyrrolidone (PVP), polyvinyl caprolactam, polyvinyl valerolactam, polyvinyl laurolactam, and polyvinyl piperidone.

4. The polishing composition according to any one of 1. to 3., in which the second water-soluble polymer is polypropylene glycol (PPG) or polybutylene glycol.

5. The polishing composition according to any one of 1. to 4., in which a pH value of the polishing composition is 1 to 9.

6. The polishing composition according to any one of 1. to 5., further containing an oxidizing agent.

7. A polishing method including a step of polishing an object to be polished with the polishing composition according to any one of 1. to 6., in which a material of the object to be polished is $Si_Y Ge_{(1-Y)}$ (here, $0 \leq Y < 1$).

8. The polishing method according to 7. in which assuming that a removing speed of the object to be polished is set as a first removing speed when a polishing pressure is 4.1 psi, and a removing speed of the object to be polished is set as a second removing speed when a polishing pressure is 1.4 psi, a value of a ratio of the first removing speed to the second removing speed is greater than 3.

9. A method of producing a polished substrate, including a step of preparing a substrate; and a step of polishing the substrate using the polishing composition according to any one of 1. to 6.

10. The method according to 9., in which the substrate is a silicon substrate containing a germanium material.

EXAMPLES

The present invention will be described in more detail by the following examples and comparative examples, but the technical scope of the present invention is not limited to the following examples. In the present specification, unless otherwise specified, measurements of operations, physical properties, and the like are performed under the conditions of room temperature (20° C. to 25° C.)/relative humidity 40% RH to 50% RH.

[Preparation of Polishing Composition]

According to the composition indicated in Table 1 below, an abrasive grain, a pH adjusting agent, an oxidizing agent, a first water-soluble polymer, and a second water-soluble polymer were mixed in a dispersing medium (ultrapure water) (mixing temperature: about 25° C., mixing time: about 10 minutes) so as to prepare a polishing composition. The pH of the polishing composition was checked using a pH meter (LAQUA manufactured by Horiba, Ltd.) (temperature of the polishing composition at pH value measurement is 25° C.) Moreover, "-" in Table 1 represents that the component is not added. The details of each component in Table 1 are as follows.

Abrasive grain: Colloidal silica (Primary particle size: 35 nm, Secondary particle size: 70 nm; Sulfonic acid group immobilized on the surface)
$HNO_3$: Nitric acid (concentration: 70%)
$NH_4OH$: Ammonium hydroxide (purity: 29%)
Acetic acid: Acetic acid (concentration: 99.8%)
Citric acid: Citric acid (purity: 30%)
Oxidizing agent: $H_2O_2$ (concentration: 31%)
PVP K12: Polyvinyl pyrrolidone (MW: 5,000)
PVP K15: Polyvinyl pyrrolidone (MW: 10,000)
PVP K30: Polyvinyl pyrrolidone (MW: 60,000)
Vinylpyrrolidone/vinyl acetate copolymers: vinyl pyrrolidone/vinyl acetate copolymer (PVP/VA W-635, prepared by Ashland; MW: 21,000)
Polyvinyl caprolactam: Polyvinyl caprolactam (MW: 6,600)
Poly(2-ethyl-2-oxazoline): Poly(2-ethyl-2-oxazoline) (MW: 50,000)
Polyvinyl alcohol: Polyvinyl alcohol (MW: 50,000)
Carboxymethyl cellulose: Carboxymethyl cellulose (MW: 90,000)
Hydroxyethyl cellulose: Hydroxyethyl cellulose (MW: 90,000)
PEG 400: Polyethylene glycol (MW: 400)
PPG 400: Polypropylene glycol (MW: 400)
PPG 1000: polypropylene glycol (MW: 1,000).

[Measurement of Polishing Speed]

The polishing speed was measured when a silicon germanium (SiGe) substrate (prepared by Silicon Valley Microelectronics, Inc.) was polished under the following polishing conditions using the polishing composition obtained above. The silicon germanium was specifically $Si_{0.75} Ge_{0.25}$.

Polishing apparatus: Single-sided CMP polishing apparatus (ENGIS: manufactured by Engis Japan Corporation)
Polishing pad: Polyurethane pad
Platen rotation speed: 90 rpm
Carrier rotation speed: 50 rpm
Flow rate of polishing composition: 100 mL/min
Polishing time: 60 sec
First polishing pressure: 4.1 psi (about 28.2 kPa)
Second polishing pressure: 1.4 psi (about 9.7 kPa)

The thickness of the object to be polished before and after polishing was measured by an optical interference type film thickness measurement system (Filmetric F20, manufactured by Filmetrics, Inc.). The polishing speed was calculated by the following equation.

Polishing speed={[Thickness before polishing]−[Thickness after polishing]}/[Treatment time]

In the above equation, the unit of thickness is Å, the unit of treatment time is minute, and the unit of polishing speed is (Å/min). The treatment time specifically means a polishing time.

[Calculation of Selection Ratio of Polishing Speed]

The polishing was performed under the above-described first polishing pressure (that is, 4.1 psi), and the first polishing speed R1 at the first polishing pressure of the object to be polished was determined by the above equation. And, the polishing was performed under the above-described second polishing pressure (that is, 1.4 psi), and the second polishing speed R2 at the second polishing pressure of the object to be polished was determined by the above equation. The value (R1/R2) of the ratio of the first polishing speed R1 to the second polishing speed R2 was calculated. Such a ratio value (R1/R2) can be used to represent the difference (ratio) of the polishing speeds at different polishing pressures (that is, portions having different heights on the surface of the same object to be polished). The larger the ratio value (R1/R2), the greater the difference in the polishing speeds at different polishing pressures, that is, the greater the selection ratio of the polishing speed. The first polishing speed R1, the second polishing speed R2, and the ratio value (R1/R2) of each example and comparative example are also indicated in Table 1.

Here, the basis of the numerical values of 4.1 psi and 1.4 psi will be described. When carrying out the polishing method, a set pressure (polishing pressure) applied to the object to be polished is set to about 2 to 3 psi in some cases. A higher pressure than the set pressure is applied to the upper portion of the step difference, and a lower pressure than the set pressure is applied to the lower part of the step difference. In this case, estimated values are about 4.1 psi and 1.4 psi, respectively. This is the basis.

Note that, 4.1 psi/1.4 psi is about 3, which is within a range of 1.5 to 4.5. Here, when the pressure applied to the object to be polished (polishing pressure) is, in particular, 0.1 to 10 psi, the ratio of the high pressure to the low pressure is approximately within the range of 1.5 to 4.5. That is, the polishing composition of the embodiment of the present invention can be applied under any polishing pressure condition.

Thus, since the polishing composition according to the embodiment of the present invention has a specific polishing pressure dependency of the polishing speed, a portion having a relatively high polishing pressure is polished faster, and a portion having a relatively low polishing pressure is polished more slowly. This contributes to efficient reduction or elimination of the step difference in the polishing composition of the present invention.

In one aspect of the present invention, R1/R2 is preferably 3.1 or more, more preferably 3.5 or more, and further preferably 4.0 or more. The larger R1/R2 is, the better, and theoretically, the more ideal reduction or elimination of the step difference can be achieved. The upper limit is not particularly limited, and practically it is about 10 or less.

reduce or eliminate the step difference, and if the ratio value (R1/R2) of the polishing speed is 3 or less, the polishing composition is determined as a rejected product that is difficult to reduce or eliminate the step difference.

Refer to Examples 1 to 15 in Table 1. Each of the polishing compositions used in Examples 1 to 15 has a first water-soluble polymer having a lactam structure and a second water-soluble polymer having an alkylene oxide represented by Formula (I). From the results of the experiments, it was found that the ratio values (R1/R2) of the polishing speeds were all greater than 3 in all of Examples 1 to 15. As understood from this, it can be determined that

TABLE 1

| | Polishing composition composition | | | | | | | | Polishing speed | | |
|---|---|---|---|---|---|---|---|---|---|---|---|
| | Abrasive grain | pH adjusting agent | Oxidizing agent | First water-soluble polymer | | | Second water-soluble polymer | | | First | Second | Ratio |
| | Content (wt %) | agent component | Content (wt %) | component | Molecular weight (g/mol) | Content (ppm) | component | Content (ppm) | pH value | polishing speed R1 | polishing speed R2 | value R1/R2 |
| Example 1 | 1 | $HNO_3$ | 0.31 | PVP K30 | 60,000 | 100 | PPG 400 | 500 | 6 | 198 | 30 | 6.6 |
| Example 2 | 1 | $HNO_3$ | — | PVP K30 | 60,000 | 100 | PPG 400 | 500 | 6 | 45 | 12 | 3.8 |
| Example 3 | 1 | $HNO_3$ | 0.31 | PVP K30 | 60,000 | 250 | PPG 400 | 500 | 6 | 84 | 16 | 5.3 |
| Example 4 | 5 | $HNO_3$ | 0.31 | PVP K30 | 60,000 | 100 | PPG 400 | 500 | 6 | 324 | 68 | 4.8 |
| Example 5 | 1 | $HNO_3$ | 0.31 | PVP K30 | 60,000 | 100 | PPG 400 | 1000 | 6 | 52 | 12 | 4.3 |
| Example 6 | 1 | $HNO_3$ | 0.31 | PVP K30 | 60,000 | 100 | PPG 400 | 500 | 2 | 46 | 14 | 3.3 |
| Example 7 | 1 | $HNO_3$ | 0.31 | PVP K30 | 60,000 | 100 | PPG 400 | 500 | 4 | 50 | 12 | 4.2 |
| Example 8 | 1 | $NH_4OH$ | 0.31 | PVP K30 | 60,000 | 100 | PPG 400 | 500 | 8 | 428 | 92 | 4.7 |
| Example 9 | 1 | $HNO_3$ | 0.31 | PVP K12 | 5,000 | 100 | PPG 400 | 500 | 6 | 132 | 36 | 3.7 |
| Example 10 | 1 | $HNO_3$ | 0.31 | PVP K15 | 10,000 | 100 | PPG 400 | 500 | 6 | 179 | 28 | 6.4 |
| Example 11 | 1 | $HNO_3$ | 0.31 | PVP K30 | 60,000 | 100 | PPG 1000 | 500 | 6 | 42 | 10 | 4.2 |
| Example 12 | 1 | Acetic acid | 0.31 | PVP K30 | 60,000 | 100 | PPG 400 | 500 | 6 | 158 | 30 | 5.3 |
| Example 13 | 1 | Citric acid | 0.31 | PVP K30 | 60,000 | 100 | PPG 400 | 500 | 6 | 160 | 34 | 4.7 |
| Example 14 | 1 | $HNO_3$ | 0.31 | Vinylpyrrolidone/vinyl acetate copolymer | 21,000 | 100 | PPG 400 | 500 | 6 | 102 | 24 | 4.3 |
| Example 15 | 1 | $HNO_3$ | 0.31 | Polyvinyl caprolactam | 6,600 | 100 | PPG 400 | 500 | 6 | 65 | 14 | 4.6 |
| Comparative Example 1 | 1 | $HNO_3$ | 0.31 | — | — | — | — | — | 6 | 456 | 154 | 3.0 |
| Comparative Example 2 | 1 | $HNO_3$ | 0.31 | — | — | — | PPG 400 | 500 | 6 | 50 | 22 | 2.3 |
| Comparative Example 3 | 1 | $HNO_3$ | 0.31 | PVP K30 | 60,000 | 100 | — | — | 6 | 424 | 213 | 2.0 |
| Comparative Example 4 | 1 | $HNO_3$ | 0.31 | PVP K30 | 60,000 | 100 | PEG 400 | 500 | 6 | 212 | 70 | 3.0 |
| Comparative Example 5 | 1 | $HNO_3$ | 0.31 | Poly(2-ethyl-2-oxazoline) | 50,000 | 100 | PPG 400 | 500 | 6 | 160 | 72 | 2.2 |
| Comparative Example 6 | 1 | $HNO_3$ | 0.31 | Polyvinyl alcohol | 50,000 | 100 | PPG 400 | 500 | 6 | 126 | 52 | 2.4 |
| Comparative Example 7 | 1 | $HNO_3$ | 0.31 | Carboxymethyl cellulose | 90,000 | 100 | PPG 400 | 500 | 6 | 32 | 20 | 1.6 |
| Comparative Example 8 | 1 | $HNO_3$ | 0.31 | Hydroxyethyl cellulose | 90,000 | 100 | PPG 400 | 500 | 6 | 58 | 32 | 1.8 |

Refer to Comparative Example 1 in Table 1. The polishing composition of Comparative Example 1 does not contain the first water-soluble polymer and the second water-soluble polymer. In Comparative Example 1, the ratio value (R1/R2) of the first polishing speed R1 to the second polishing speed R2 is 3. In the present specification, Comparative Example 1 is used as a reference for evaluation. If the ratio value (R1/R2) of the polishing speed is larger than 3, the polishing composition is determined as an acceptable product that can any of the polishing compositions used in Examples 1 to 15 can reduce or eliminate the step difference.

Refer to Comparative Example 2 in Table 1. The polishing composition of Comparative Example 2 does not contain the first water-soluble polymer. Further, refer to Comparative Example 3 in Table 1. The polishing composition of Comparative Example 3 does not contain the second water-soluble polymer. From the results of the experiments, it is found that the ratio values (R1/R2) of the polishing speeds in Comparative Examples 2 and 3 are all less than 3. As understood from the above, it is difficult to reduce or eliminate the step difference by using the first water-soluble polymer or the second water-soluble polymer alone. Further, in comparison to the polishing composition which does not use the first water-soluble polymer and the second water-soluble polymer, in the polishing composition using the first water-soluble polymer or the second water-soluble polymer alone, the ability to eliminate the step difference may be rather reduced.

Refer to Example 1 and Comparative Example 4 in Table 1 at the same time. Comparative Example 4 uses polyethylene glycol (PEG) in place of the polypropylene glycol of Example 1. The other components of the polishing composition of Comparative Example 4 are all the same as those of Example 1. From the results of the experiments, it is found that the ratio value (R1/R2) of the polishing speed of Comparative Example 4 is equal to 3 and the ratio value (R1/R2) of the polishing speed of Example 1 is 6.6. As understood from this, when a water-soluble polymer different from the above-described Formula (I) is used instead of the second water-soluble polymer, it is difficult to effectively improve the ability to eliminate the step difference.

Refer to Comparative Examples 5 to 8 in Table 1. In each of the polishing compositions of Comparative Examples 5 to 8, a water-soluble polymer having no lactam structure is used instead of the first water-soluble polymer. From the results of the experiments, it is found that the ratio values (R1/R2) of the polishing speed of the polishing compositions of Comparative Examples 5 to 8 are all 3 or less. As understood from this, when a water-soluble polymer having no lactam structure is used instead of the first water-soluble polymer, it is difficult to effectively improve the ability to eliminate the step difference, and thus the ability to eliminate the step difference may be more reduced.

In summary, the polishing composition according to the present invention contains two kinds of water-soluble polymers each having a specific structure. When polishing is performed using the polishing composition of the present invention, it is possible to increase the difference (ratio) in removing speed of portions having different heights on the surface of the same object to be polished. In other words, the difference (ratio) in the removing speed of the same material under different polishing pressures can be increased. Therefore, even when polishing the object to be polished made of the same material, it is possible to effectively reduce or eliminate the step difference present on the surface of the object to be polished.

And, the polishing composition according to the present invention can be used in a chemical mechanical polishing process and is useful for obtaining a substrate with a flat surface. Therefore, it has industrial applicability.

Although the present invention has been disclosed as above according to some preferable embodiments, these are not intended to limit the present invention, and a person skilled in the art can naturally add any change and modification without departing from the spirit and scope of the present invention. Therefore, the protection scope of the present invention is based on what is defined in the following claims.

This application is based on Japanese Patent Application No. 2018-183310 filed on Sep. 28, 2018, the disclosure of which is incorporated in its entirety by reference.

What is claimed is:

1. A polishing composition comprising:
   an abrasive grain;
   a pH adjusting agent;
   a dispersing medium; and
   at least one kind of first water-soluble polymer having a lactam structure and at least one kind of second water-soluble polymer containing an alkylene oxide represented by the following Formula (I) in the structure,

[Chem. 1]

$$\{C_xH_{2x}O\}_n \qquad (I)$$

(in the Formula (I), X is an integer of 3 or more and n is an integer of 2 or more).

2. The polishing composition according to claim 1, wherein the second water-soluble polymer is polypropylene glycol (PPG) or polybutylene glycol.

3. The polishing composition according to claim 1, wherein a pH value of the polishing composition is 1 to 9.

4. The polishing composition according to claim 1, further comprising an oxidizing agent.

5. The polishing composition according to claim 1, wherein the first water-soluble polymer is a homopolymer of a monomer containing the lactam structure, or a copolymer of a monomer containing the lactam structure and another monomer.

6. The polishing composition according to claim 5, wherein the homopolymer of the monomer containing the lactam structure includes at least one kind selected from the group consisting of polyvinylpyrrolidone (PVP), polyvinyl caprolactam, polyvinyl valerolactam, polyvinyl laurolactam, and polyvinyl piperidone.

7. A polishing method comprising:
   a step of polishing an object to be polished with the polishing composition according to claim 1,
   wherein a material of the object to be polished is $Si_YGe_{(1-Y)}$ (here, $0 \leq Y < 1$).

8. The polishing method according to claim 7, wherein assuming that a removing speed of the object to be polished is set as a first removing speed when a polishing pressure is 4.1 psi, and a removing speed of the object to be polished is set as a second removing speed when a polishing pressure is 1.4 psi, a value of a ratio of the first removing speed to the second removing speed is greater than 3.

9. A method of producing a polished substrate, the method comprising:
   a step of preparing a substrate; and
   a step of polishing the substrate using the polishing composition according to claim 1.

10. The method according to claim 9, wherein the substrate is a silicon substrate containing a germanium material.

* * * * *